United States Patent
Bosses

[11] Patent Number: 5,080,702
[45] Date of Patent: Jan. 14, 1992

[54] DISPOSABLE TWO-PLY FILTER
[75] Inventor: Mark D. Bosses, New York, N.Y.
[73] Assignee: Home Care Industries, Inc., Clifton, N.J.
[21] Appl. No.: 480,575
[22] Filed: Feb. 15, 1990
[51] Int. Cl.$^5$ ............................................. B01D 46/02
[52] U.S. Cl. ........................................ 55/382; 55/473; 428/34.3; 428/35.2; 428/296; 428/903
[58] Field of Search ................. 55/380, 381, 382, 376, 55/473; 428/172, 171, 34.3, 35.2, 296, 903

[56] References Cited

U.S. PATENT DOCUMENTS

| | | |
|---|---|---|
| 1,835,770 | 12/1931 | Gasner et al. |
| 2,225,389 | 12/1940 | Österdahl .................... 183/51 |
| 3,535,855 | 10/1970 | Howard et al. .............. 55/368 |
| 3,606,740 | 9/1971 | Ballennie . |
| 3,859,064 | 1/1975 | Cordell . |
| 3,871,850 | 3/1975 | Lenane . |
| 3,990,872 | 11/1976 | Cullen . |
| 4,011,067 | 3/1977 | Carey, Jr. . |
| 4,426,417 | 1/1984 | Meitner et al. .............. 428/195 |
| 4,589,894 | 5/1986 | Gin et al. ..................... 55/274 |
| 4,784,892 | 11/1988 | Storey et al. . |
| 4,816,328 | 3/1989 | Saville et al. . |

FOREIGN PATENT DOCUMENTS

| | | |
|---|---|---|
| 89106843 | 10/1989 | European Pat. Off. . |
| 2908102 | 9/1980 | Fed. Rep. of Germany . |
| 50-56455 | 5/1975 | Japan . |
| 2036591A | 7/1990 | United Kingdom . |

Primary Examiner—Paul J. Thibodeau
Assistant Examiner—Robert J. Follett
Attorney, Agent, or Firm—Fitzpatrick, Cella, Harper & Scinto

[57] ABSTRACT

A disposable two-ply vacuum cleaner bag comprises a highly air permeable inner filter ply of randomly intertangled, discontinuous microfibers of synthetic material and a conventional outer ply of air permeable material.

15 Claims, 1 Drawing Sheet

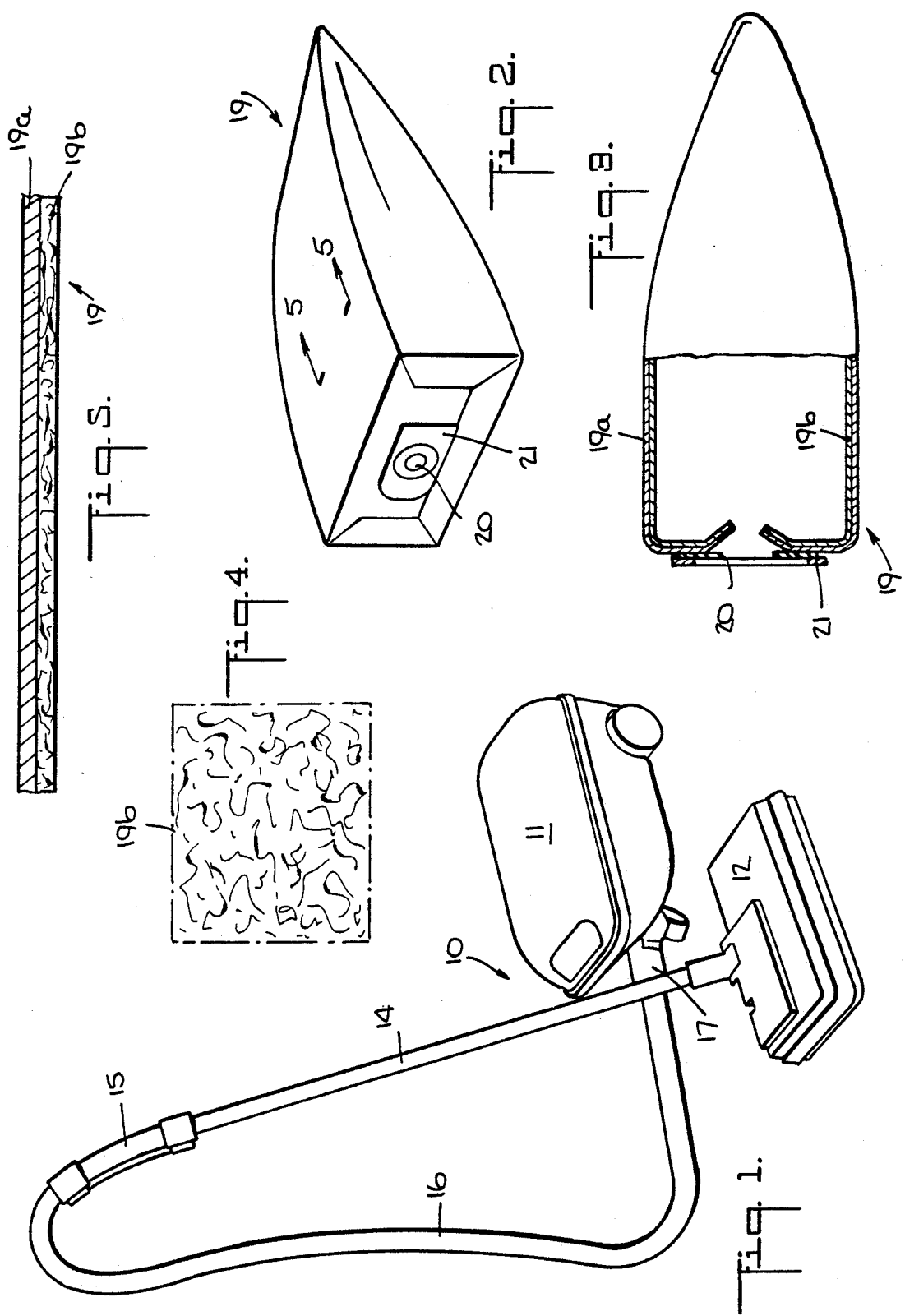

DISPOSABLE TWO-PLY FILTER

BACKGROUND OF THE INVENTION

1. Field of the Invention

This invention relates to vacuum cleaner bags having at least two layers and wherein the inner layer is comprised of a non-woven air filter formed of melt-blown, microfiber webbing.

2. Description of the Prior Art

A variety of vacuum cleaner filters utilizing non-woven components are known. For example, U.S. Pat. No. 2,813,596 discloses a disposable vacuum cleaner dust container that has a strong, porous wrapper of sheet material able to filter dust particles from an air stream and a liner that includes plies of creped, cellulosic wadding.

U.S. Pat. No. 3,498,031 relates to a vacuum cleaner bag containing a reinforcing and auxiliary filter insert of felt-like material and U.S. Pat. No. 4,540,625 is concerned with a flexible composite useful in fabricating filters and having a fiber mass of a randomly oriented mixture of non-woven substrate fibers and organic polymer fibers intertwined therewith and containing solid sorptive microscopic particles disposed against the non-woven fibers to form a flexible, air permeable, absorbent fiber filter. Other examples of filters using non-woven components will be found in U.S. Pat. Nos. 3,535,855, 4,257,791 which is a division of U.S. Pat. No. 4,164,400, 4,397,907 and 4,522,876.

Of particular interest is U.S. Pat. No. 4,589,894 which explains that vacuum cleaners typically draw air at relatively high velocity and volume adjacent a surface to be cleaned to pick up loose dirt and debris. They then expel an air stream which includes the dirt and debris through an outlet fitted with an air filter which separates the dirt and debris from the air stream.

It is also explained that the selection of materials which form the filter is somewhat limited inasmuch as the filter must be sufficiently strong to withstand the pressure build up in the vacuum cleaner yet have a porosity which permits the passage of air at a sufficient rate while filtering the dust and debris.

The patent cites the Ninth Technical Symposium: "Nonwovens in the '80s: Years of Change" March 9, 1981 sponsored by INDA Association of the Nonwoven Fabrics Industry, for its teaching that melt-blown polypropylene micro-fiber webs would provide a superior filter as compared to paper with respect to dust pickup and yet have a low pressure drop. It points out, however, that such filters are known to be relatively fragile and will not, without rupture, sustain the pressure build up caused by a vacuum cleaner. It goes on to say that such filters have insufficient strength to resist damage induced by mechanical erosion caused by the influx of airborne dirt and debris or sufficient tensile strength to resist tearing because of sagging as the bottom of the bag fills with dirt. Further, the '894 patent reports that micro-film webs are known to be very susceptible to damage just in handling and therefore are thought to be unlikely candidates for use in vacuum cleaners where handling to permit filter placement is a must.

U.S. Pat. No. 4,589,894 also refers to several patents including U.S. Pat. No. 4,116,648 for its disclosure of a disposable vacuum cleaner filter bag made with a relatively weak but efficient fiberglass filter spaced between support layers of air pervious paper. The '894 patent notes however, that such a construction would not be suited for use with the micro-fiber web since the paper support members would act as a paper filter and would typically clog early, drastically reducing the useful life of the filter.

With the foregoing considerations in mind, U.S. Pat. No. 4,589,894 discloses a vacuum cleaner disposable filter, preferably in the form of a closed container, having an inlet for connection to the air discharge outlet of a vacuum cleaner and comprising an assembly of layers. The inner filter layer of that assembly is provided by a non-woven micro-fiber web formed of randomly entangled synthetic polymer micro-fibers sandwiched between highly porous outer support layers each preferably comprising spun-bonded, non-woven webs on either side of the inner layer More specifically, that patent teaches a filter comprising an assembly of juxtaposed layers, as follows: (a) a first outer support layer of highly porous fabric formed of synthetic fibers, the fabric having an air permeability of at least 100 $m^3/min/m^2$ and a grab strength of at least about 1.0 kg; (b) an inner filter layer formed of a web comprising randomly interentangled synthetic polymeric microfibers that are less than 10 microns in diameter and having a weight of about 40 to 200 $g/m^2$ and an air permeability of about 3 to 60 $m^3/min/m^2$; and (c) a second outer support layer of highly porous fabric formed of synthetic fibers, the second outer support layer being disposed on the opposite side of said web from the first outer support layer, the fabric of the second layer having an air permeability of at least 50 $m^3/min/m^2$ and a grab strength of at least about 1.0 kg.

The outer support layers preferably are highly porous and light weight webs of synthetic fibers which are spun bonded, spun laced, bonded wet laid, or net-like fabrics.

SUMMARY OF THE INVENTION

Contrary to the teachings of the '894 patent, I have found that I can use a melt-blown filter layer without sandwiching it between two other support layers. Specifically, I have found that I can make a superior disposable vacuum cleaner bag by combining a melt-blown filter layer inside an outer conventional bag to form a closed container having an opening for connection to the air outlet of a vacuum cleaner. Such a composite bag is characterized by superior dust filtration capabilities while possessing sufficient strength effectively to sustain without rupture the pressure build up caused by a vacuum cleaner, to resist damage induced by mechanical erosion caused by the influx of dirt and debris and to resist damage due to normal handling. The bag that I have developed also exhibits sufficient tensile strength to resist tearing because of sagging as the bottom of the bag fills with dirt.

The foregoing features of my contribution are achieved without the need to assemble the web between support layers thus reducing material and manufacturing costs as well as production time relative to the filter disclosed in U.S. Pat. No. 4,589,894.

I have found that in tests employing A.S.T.M. approved test dust as a vehicle, a conventional, plain paper vacuum cleaner bag such as a Panasonic type U disposable bag quickly becomes plugged with fine dust particles and thus has a short service life, whereas the same bag with a melt-blown liner according to my invention has a relatively considerably extended service life and remains relatively clean while the liner filters substantially all of the dust out of the air stream.

There has thus been outlined rather broadly the more important features of the invention in order that the detailed description thereof that follows may be better understood, and in order that the present contribution to the art may be better appreciated. There are, of course additional features of the invention that will be described hereinafter and which will form the subject of the claims appended hereto. Those skilled in the art will appreciate that the conception upon which this disclosure is based may readily be utilized as a basis for the realization of other structures or methods for carrying out the several purposes of the invention. It is important, therefore, that the claims be regarded as including such equivalent constructions and methods as do not depart from the spirit and scope of the invention.

DESCRIPTION OF THE DRAWINGS

Specific embodiments of the invention have been chosen for purposes of illustration and description, and are shown in the accompanying drawing, forming a part of the specification wherein:

FIG. 1 is a perspective view of a vacuum cleaning device of the tank type fitted with the improved filter of the present invention;

FIG. 2 is a perspective view of a tank type filter bag according to my invention and of conventional configuration;

FIG. 3 is a profile view of the bag of FIG. 2, partly broken away to show the inner and outer plys in cross-section;

FIG. 4 is a plan view of a piece of the non-woven melt-blown microfiber webbing forming the inner ply; and FIG. 5 is a cross-sectional view taken along the line 5—5 of FIG. 2.

DESCRIPTION OF THE PREFERRED EMBODIMENT

Referring now to the drawing, FIG. 1 illustrates a conventional canister type vacuum cleaner 10 which has a wheel mounted canister housing 11 containing a conventional motor driven blower (not shown). The blower causes air, dirt and debris to be picked up by a cleaner head 12 and to pass at relatively high velocity and volume through a length of rigid pipe 14, a rigid tubular handle 15 and a length of flexible tubing 16 connected to a housing inlet 17 and into a filter 19 contained within the housing 11. The filter is impervious to all but the very finest dust particles and so traps substantially all of the particles of dirt and debris in the air stream but is pervious to air so that clean air is discharged from a housing outlet (not shown).

The filter may of course take any convenient shape to fit properly within the housing 11 and FIGS. 2 and 3 illustrate a typical configuration. The filter 19 here shown is formed of an outer ply 19a which may be wood paper, hemp paper or any other filter paper or fabric well known in the art. The inner ply 19b formed of non-woven, melt-blown, microfiber webbing freely lines the outer ply. The assembled bag is flat in front and rear elevation and oval in profile, the upper and lower ends being folded back upon the bag and fastened to the adjacent exterior surface.

As also shown in FIGS. 2 and 3, the area around the filter opening or inlet 20 may be reinforced by an overlying support collar 21 formed with an opening registering with inlet 20.

More specifically, the inventive concept underlying my invention comprises a two-ply bag in which the inner ply is a web of about 6 mils in thickness formed of randomly intertangled synthetic polymeric microfibers that have an individual test weight of the order of 0.4 to 1.7 oz./sq. yd., and preferably an average weight of about 0.6 oz./sq. yd., and are less than 10 and preferably 4±2 microns in diameter. This inner web exhibits substantially the following characteristics:

Grab tensile strength in the machine direction of about 2.6 lbs. and in the cross direction of about 2.5 lbs., trap tear strength in the machine direction of about 0.2 lbs. and in the cross direction of about 0.2 lbs., Mullen burst strength of about 4 psi and Frazier porosity or permeability of the order of 60 to 100 cfm as measured at 0.5 inches $H_2O$ pressure drop.

The outer ply may be wood paper, hemp paper or any other filter paper, cloth or fabric well known in the art.

FIG. 4 illustrates the non-woven, microfiber webbing which is preferably formed of randomly intertangled, discontinuous fiber-forming thermoplastic material such as polypropylene, polyethylene, a mixture thereof, polyethylene terephthalate, polyamides or other known polymers, the microfiber webbing of which constitute the single ply 19b freely lining the outer bag 19a. By the use of the term "freely lining" I mean that the inner ply 19b need not be adhered to the inner surface of the outer ply 19a although I prefer to connect the plys together in the vicinity of the inlet.

Among the materials mentioned from which the inner ply is formed, I prefer to employ polyethylene or polypropylene.

I have mentioned that the outer ply may be wood or hemp paper or other known filter paper or fabric. A typical outer ply may, for example, comprise randomly intertangled cellulose fibers bonded at fiber cross over joints by natural hydrogen bonding and reinforced with 7 to 15% starch or latex binder to help bond the cellulose fibers. The fibers are predominantly softwood kraft cellulose. The ply has a total average weight of 16 to 38 lb/3000 sq.ft., and a Frazier air permeability greater than 10 but preferably 20-25 cfm as measured at 0.5 inches $H_2O$ pressure drop.

I have caused a series of comparative tests to be performed in order to be able to evaluate the performance characteristics of a two-ply vacuum filter bag made of conventional materials and my new two-ply bag.

For test purposes, I employed an unmodified Kenmore (trademark of Sears Roebuck & Co.) 5033 vacuum cleaner.

A total of nine sample bags were constructed in each of the following categories employing outer and inner plys as indicated:

Samples 1A through 1I: Kimberly Clark's 34# wood outer sheet with meltblown liner.

Samples 2A through 2I: Kimberly clarks's 34# wood outer sheet with conventional hemp liner.

Samples 3A through 3I: Monadnocks's 38# latex outer sheet with meltblown liner.

Samples 4A through 4I: Monadnock's 38# latex outer sheet with conventional liner.

Samples 5A through 5I: Stora's 27# synthetic outer sheet with meltblown liner.

Samples 6A through 6I: Stora's 27# synthetic outer sheet with conventional hemp liner.

Samples 7A through 7I: Manning's 37# hemp outer sheet with meltblown liner.
Samples 8A through 8I: Manning's 37# hemp outer sheet with conventional hemp liner.

The bags were grouped according to the above identification and following the tests, average results were tabulated.

Clogging Rate Test: This test was designed to measure the percentage of suction lost as predetermined quantities of A.S.T.M. approved test dust are introduced into the vacuum filter bag by means of normal operation. The average loss is as follows:

| | SUCTION LOSS (%) | | | |
|---|---|---|---|---|
| Results After | SAMPLES 1A, 1B, 1C | SAMPLES 2A, 2B, 2C | SAMPLES 3A, 3B, 3C | SAMPLES 4A, 4B, 4C |
| 10 grams | 2.4 | 13.4 | 3.7 | 9.4 |
| 20 grams | 4.7 | 22.7 | 6.4 | 14.7 |
| 30 grams | 7.0 | 30.0 | 9.0 | 21.4 |
| 40 grams | 10.4 | 35.4 | 14.4 | 27.0 |
| 50 grams | 14.7 | 40.0 | 19.4 | 31.0 |
| Results After | SAMPLES 5A, 5B, 5C | SAMPLES 6A, 6B, 6C | SAMPLES 7A, 7B, 7C | SAMPLES 8A, 8B, 8C |
| 10 grams | 3.7 | 8.4 | 3.4 | 16.7 |
| 20 grams | 7.7 | 15.7 | 6.4 | 26.0 |
| 30 grams | 12.7 | 21.7 | 11.4 | 32.7 |
| 40 grams | 17.7 | 27.0 | 15.7 | 37.4 |
| 50 grams | 23.4 | 31.4 | 22.4 | 40.7 |

The suction loss continued at approximately the same rate as that shown above until the conclusion of each test. Each test was considered complete when a 60% loss of suction had occurred, which indicated the need for bag replacement.

Shock Durability Test: This test was designed to evaluate the overall soundness of construction of the filter bag by partially clogging the pores of the paper with A.S.T.M. approved test dust and then repeatedly flexing the bag in the vacuum every 7 seconds for 12 hours. Any rupturing of the seams, paper, folds, or collar attachment prior to 12 hours was considered a failure.

| SAMPLE # | AVERAGE RESULT |
|---|---|
| 1D, 1E, 1F | 12 Hours |
| 2D, 2E, 2F | 12 Hours |
| 3D, 3E, 3F | 12 Hours |
| 4D, 4E, 4F | 12 Hours |
| 5D, 5E, 5F | 12 Hours |
| 6D, 6E, 6F | 12 Hours |
| 7D, 7E, 7F | 12 Hours |
| 8D, 8E, 8F | 12 Hours |

Sand Abrasion Test: This test was designed to measure abrasion resistance of the inside surfaces of the filter bag and was performed by feeding 200 ml of silica sand into the machine and allowing it to circulate for 60 minutes. Any holes worn through both plies of paper prior to 30 minutes constitutes a failure.

| SAMPLE # | AVERAGE RESULT |
|---|---|
| 1G, 1H, 1I | 60 Minutes |
| 2G, 2H, 2I | 45 Minutes |
| 3G, 3H, 3I | 60 Minutes |
| 4G, 4H, 4I | 52 Minutes |
| 5G, 5H, 5I | 47 Minutes |
| 6G, 6H, 6I | 37 Minutes |
| 7G, 7H, 7I | 60 Minutes |
| 8G, 8H, 8I | 60 Minutes |

In addition to the test mentioned previously, the following criteria were also evaluated using the average of three samples tested:

| | SAMPLE SERIES | | | | | | | |
|---|---|---|---|---|---|---|---|---|
| CHARACTERISTIC | #1 | #2 | #3 | #4 | #5 | #6 | #7 | #8 |
| Empty bag wgt (gms) | 42.9 | 41.1 | 46.6 | 44.9 | 40.7 | 38.5 | 43.5 | 41.7 |
| Max suction (in) | 17.6 | 16.1 | 17.0 | 16.2 | 17.2 | 16.7 | 16.5 | 15.9 |
| Max dust cap (gms) | 120 | 103 | 130 | 110 | 130 | 113 | 130 | 110 |
| Dust leakage (gms) | 0.8 | 4.3 | 1.0 | 4.1 | 1.1 | 8.2 | 0.9 | 3.7 |
| Actual cap (gms) | 119.2 | 98.7 | 129.0 | 105.9 | 128.9 | 104.8 | 129.1 | 106.3 |
| Dust leakage (%) | .7 | 4.2 | .8 | 3.7 | .8 | 7.2 | .7 | 3.4 |

Conclusion: Regardless of the grade of outer ply used, the non-woven meltblown liner exhibited superior abrasion resistance, increased air-flow properties, improved suction level during clogging and substantially reduced dust leakage into the vacuum cavity as well as into the atmosphere.

I believe that the construction and use of my novel, disposable meltblown lined two-ply vacuum cleaner bag will now be understood and that its advantages will be fully appreciated by those persons skilled in the art.

I claim:

1. A disposable filter container having an interior for use primarily for collecting within said interior dust and debris from a vacuum apparatus, and comprising an assembly of juxtaposed plies as follows:

an inner filter ply formed of a web of randomly intertangled, discontinuous microfibers of synthetic material comprising fibers of less than about ten microns diameter with an average weight of about 0.6 oz/yd$^2$, an individual test weight range of about 0.4 to 1.7 oz/yd$^2$, and a Frazier air permeability of greater than about 60 CFM as measured at 0.5 inches H$_2$O pressure drop, said inner filter ply forming the surface of the interior of said container; and an outer ply of air pervious filter material.

2. A filter container according to claim 1, wherein said synthetic material is selected from the group comprising polypropylene, polyethylene, polyethylene terephthalate and polyamides.

3. A filter container according to claim 2, wherein said synthetic material is polyethylene.

4. A filter container according to claim 2, wherein said synthetic material is polypropylene.

5. A filter container according to claim 2, wherein said synthetic material comprises a mixture of polyethylene and polypropylene.

6. A filter container according to claim 1 or 2 wherein the diameter of said fibers is 4±2 microns.

7. A filter according to claim 1 or 2, wherein said inner filter ply is formed of melt-blown synthetic material.

8. A filter container according to claim 1 or 2, wherein said outer ply is formed of filter paper or fabric.

9. A filter according to claim 8 wherein said outer ply is formed of wood paper.

10. A filter according to claim 8, wherein said outer ply is formed of hemp paper.

11. A filter according to claim 8, wherein said outer ply is formed of cloth.

12. A filter container according to claim 1 or 2, wherein said inner ply has an individual test weight of at most about 0.6 oz/yd$^2$.

13. A filter container according to claim 12, wherein said inner ply has an individual test weight of about 0.6 oz/yd$^2$.

14. A container according to claim 1 or 2, wherein said inner and outer plies are connected together in the vicinity of an inlet which provides fluid communication from said vacuum apparatus to said interior.

15. A filter container according to claim 8, wherein said outer ply is formed of paper.

* * * * *